(12) United States Patent
Scherlis et al.

(10) Patent No.: US 9,584,571 B2
(45) Date of Patent: *Feb. 28, 2017

(54) SYSTEM AND METHOD FOR CAPTURING, EDITING, SEARCHING, AND DELIVERING MULTI-MEDIA CONTENT WITH LOCAL AND GLOBAL TIME

(71) Applicant: Carnegie Mellon University, Pittsburgh, PA (US)

(72) Inventors: William L. Scherlis, Pittsburgh, PA (US); Eric Burns, Seattle, WA (US)

(73) Assignee: Carnegie Mellon University, Pittsburgh, PA (US)

( * ) Notice: Subject to any disclaimer, the term of this patent is extended or adjusted under 35 U.S.C. 154(b) by 96 days.

This patent is subject to a terminal disclaimer.

(21) Appl. No.: 14/559,375

(22) Filed: Dec. 3, 2014

(65) Prior Publication Data

US 2015/0381685 A1 Dec. 31, 2015

Related U.S. Application Data

(63) Continuation of application No. 13/868,276, filed on Apr. 23, 2013, now Pat. No. 8,910,225, which is a continuation of application No. 11/634,441, filed on Dec. 6, 2006, now Pat. No. 8,437,409.

(51) Int. Cl.
| | |
|---|---|
| *H04N 7/173* | (2011.01) |
| *H04L 29/06* | (2006.01) |
| *H04N 21/235* | (2011.01) |
| *H04N 21/435* | (2011.01) |
| *H04N 21/84* | (2011.01) |
| *H04N 21/845* | (2011.01) |

(52) U.S. Cl.
CPC ............ *H04L 65/601* (2013.01); *H04L 65/60* (2013.01); *H04N 21/235* (2013.01); *H04N 21/435* (2013.01); *H04N 21/84* (2013.01); *H04N 21/8455* (2013.01)

(58) Field of Classification Search
CPC ..................................................... H94L 65/601
USPC ........................................................ 725/105
See application file for complete search history.

(56) References Cited

U.S. PATENT DOCUMENTS

| | | |
|---|---|---|
| 5,784,099 A | 7/1998 | Lippincott |
| 5,786,814 A | 7/1998 | Moran et al. |
| 5,966,121 A | 10/1999 | Hubbell et al. |

(Continued)

FOREIGN PATENT DOCUMENTS

| | | |
|---|---|---|
| EP | 1377047 A2 | 1/2004 |
| WO | WO 96/08107 A1 | 3/1996 |

*Primary Examiner* — Richard Torrente
(74) *Attorney, Agent, or Firm* — Jones Day

(57) ABSTRACT

Various acquisition streams are delivered, synchronously or asynchronously, to a server. Those streams having local time indicia are synchronized with the global timeline and the various acquisition streams are then stored. Low bit rate streams corresponding to the stored acquisition streams are generated for use in subsequent editing of the acquisition streams. The editing of the acquisition streams entails reviewing the various acquisition streams and selecting portions for replay. The portions selected for replay are identified through metadata which is then stored. The replay or distribution mode begins by editing the global timeline using the metadata generated in the editing mode so as to produce an edited timeline. The various acquisition streams are then rendered or played back according to the edited timeline to produce a distribution stream.

25 Claims, 12 Drawing Sheets

(56) References Cited

U.S. PATENT DOCUMENTS

| | | | |
|---|---|---|---|
| 6,452,615 | B1 | 9/2002 | Chiu et al. |
| 6,785,013 | B1 | 8/2004 | Ota et al. |
| RE38,609 | E | 10/2004 | Chen et al. |
| 7,096,271 | B1 | 8/2006 | Omoigui et al. |
| 7,580,612 | B2 | 8/2009 | Sato et al. |
| 2002/0018124 | A1 | 2/2002 | Mottur et al. |
| 2002/0170068 | A1 | 11/2002 | Rafey et al. |
| 2004/0240541 | A1 | 12/2004 | Chadwick et al. |
| 2005/0246725 | A1 | 11/2005 | Odins-Lucas et al. |
| 2008/0122986 | A1 | 5/2008 | Diederichsen |
| 2008/0256463 | A1 | 10/2008 | Li et al. |
| 2009/0249393 | A1 | 10/2009 | Shelton et al. |

SYSTEM AND METHOD FOR CAPTURING, EDITING, SEARCHING, AND DELIVERING MULTI-MEDIA CONTENT WITH LOCAL AND GLOBAL TIME

CROSS REFERENCE TO RELATED APPLICATIONS

This patent application is a continuation of U.S. patent application Ser. No. 13/868,276, filed Apr. 23, 2013, and entitled "System and Method for Capturing, Editing, Searching, and Delivering Multi-Media Content with Local and Global Time," which is a continuation of U.S. patent application Ser. No. 11/634,441, filed Dec. 6, 2006, and entitled "Systems and Methods for Capturing, Editing, Searching, and Delivering Multi-Media Content." The entire contents of the aforementioned applications are expressly incorporated herein by reference.

BACKGROUND

The present invention is directed generally to video capture and editing systems.

A number of systems are known or have been proposed that are directed to various aspects of the present disclosure. For example, U.S. patent publication no. 2002/0018124 A1 entitled Methods and Systems for Networked Camera Control discloses methods and systems for providing fluid, real-time camera control of at least one camera to at least one network user via a network including the Internet. A control pad or area can be provided to camera users via an application or applet that can be calibrated to provide fluid camera control. Compressed or uncompressed analog, digital, or streaming video and audio data can also be provided to the users to allow real-time low latency continuous audio/visual feedback. Multiple camera users can obtain control of a camera using a dynamic queuing technique that can allow single user camera control for certain time intervals. An administrator can establish user camera control parameters including camera control intervals for subscriber users versus non-subscriber users, camera usurping by an administrator, elimination of camera control privileges for a user, and denial of camera control requests by a user.

U.S. Pat. No. 6,785,013 entitled System for Capturing Images From a Peripheral Unit and Transferring the Captured Images to an Image Management Server discloses an image data storing system, and more particularly a video capture controller to capture raw video image data from a peripheral unit and to provide compressed video image data to a document image management server. The video capture controller includes a control processor, a first memory, and a second memory. The first memory stores raw video image data from the peripheral unit under control of the control processor. The raw video image data stored in the first memory is then converted into compressed video image data, and is then stored in the second memory, again under control of the control processor. Then, the compressed video image data from the second memory is transferred to the image management server. A third memory may further be provided between the peripheral unit and the first memory. This third memory can be a page memory which performs a direct memory access of the raw video image data output from the peripheral unit into the page memory. The raw video image data may be initially output to the page memory when the page memory is set to a maximum page size. Then, the page size setting of the third memory can be changed based on subsequently received page size data. These operations ensure that the raw video image data can be quickly stored in a first memory, which may prevent having to reduce a speed of generating the raw video image data in the peripheral unit. Further, if the raw video image data is output prior to outputting accompanying commands indicating a page size of the raw video image data, no raw video image data will be lost.

U.S. publication no. 2004/0240541 entitled Method and System for Direct Ingest and Storage of Digital Video Content With Immediate Access to Content for Browsing and Editing discloses a video encoder system and method for receiving uncompressed streaming video and outputting a continuous compressed video stream. The system uses a video encoder to compress the input video stream, and a formatter and indexer to receive the compressed video stream, apply indexing metadata and formatting metadata to the video stream, and output a formatted video stream that is capable of storage and access.

U.S. publication no. 2005/0246725 entitled Method and System for Sharing Video Over a Network enables a user to create a video segment or employ an existing video segment, and then share it over a computer network. The user provides an indication that one or more particular video segments are to be shared over the network. The video segment(s) is/are then automatically assessed and determined to be compatible with streaming video, or not. If the video segment(s) is/are not compatible with streaming video, it/they are converted to a compatible format automatically. An identifier for the video segment is automatically created and the segment and the identifier are automatically uploaded to a host computer over the network such as the Internet. The video segment and the identifier (optionally with other identifying material such as an identity of the sender, an access authorization for the video, a number of accesses permitted, and a duration for the availability of the video) can be stored at the direction of the host computer. A viewer can be sent an identifier of the video, and can request that the video be served as a streaming video to the viewer's computer. Alternatively, the viewer can be sent a location of the video such as a URL, can be served the video as an embedded portion of a Web page, or can be served the video as a consequence of being sent a link in an e-mail or as an e-mail greeting card.

U.S. Pat. No. RE38,609 E is entitled On-Demand Presentation Graphical User Interface. Disclosed therein is a graphical user interface ("GUI") comprising: a video region for displaying a video of a presenter giving a presentation; a primary slide region for displaying slides used by the presenter during the presentation; and a thumbnail region containing thumbnails representing slides in the presentation, the thumbnails selectable by a user via a cursor control device.

Finally, U.S. Pat. No. 5,966,121 entitled Interactive Hypervideo Editing System and Interface discloses an apparatus and method for interfacing with a hypervideo multimedia application when composing and playing same. A novel hypervideo control and interface provides for either user-actuated or automatic transitioning between a plurality of video, graphics, textual, animation, and other types of multimedia files. A hypervideo control preferably transitions through distinct lifecycle phases and events as it is presented and removed from an interface display to visually convey to a user the present availability and impending removal of the control from the interface display, thereby providing an intuitive means for navigating a hypervideo application. In one embodiment, a hypervideo editing system includes a wordprocessing system and a separate video playback system. An author of a hypervideo application preferably identifies a particular frame of video displayed by the video playback system and creates an ASCII compliant mark video file that defines the type and functional characteristics of hypervideo controls, marks, and actions using the wordprocessing system. In a preferred embodiment, editing and playing of a hypervideo application is facilitated by a software-implemented hypervideo editing system that provides an intuitive graphical-user-interface (GUI) to facilitate rapid, real-time hypervideo application development, as well as playback capability. Object-oriented design principles are preferably employed to permit efficient linking and embedding of a hypervideo application or interface into an off-the-shelf software application or other parent application.

SUMMARY OF THE PRESENT DISCLOSURE

The present invention has the capability to handle, in a scalable manner, a wide diversity of heterogeneous information streams which may be generated by separate (or the same) computer(s), or other capture devices, which may or may not be connected to a network. Here, "handle" refers to efficient, scalable, multi-stream acquisition (including after-the-fact acquisition of new information streams) and remote network-based editing of the multiple streams. The system also supports management for access control and delivery. In addition the system has an integrated approach to assimilation and management of metadata and support for content-based searching.

The present invention is directed to apparatus and methods for operating the apparatus according to a session acquisition mode, an editing mode, and a playback or distribution mode. In the session acquisition mode, a global timeline sync signal is supplied to various capture devices. In response to the global timeline sync signal or a locally generated start signal, acquisition streams are automatically produced which capture an analog or digital input signal. Those acquisition streams produced by capture devices in sync with the global timeline (i.e., online devices) will have time indicia in sync with the global timeline. Those capture devices which are not in sync with the global timeline (i.e., offline devices) will have local time indicia. The system may include one or more on line capture devices that come on line and go off line during the global time line, one or more online capture devices operating in conjunction with one or more offline capture devices, or a plurality of offline capture devices. The various acquisition streams are delivered, synchronously or asynchronously, to a server. Those streams having local time indicia are synchronized with the global timeline and the various acquisition streams are then stored. Low bit rate streams corresponding to the stored acquisition streams are generated for use in subsequent editing of the acquisition streams.

The editing of the acquisition streams entails reviewing the various acquisition streams and selecting portions for replay. The editing may include "after the fact videography" in which one or more portions from a fixed view are selected for replay. The portions could include, for example, two rectangles of varying size. The portions selected for replay are identified through metadata which is then stored.

The replay or distribution mode begins by editing the global timeline using the metadata generated in the editing mode so as to produce an edited timeline. The various acquisition streams are then rendered or played back according to the edited timeline to produce a distribution stream. The distribution stream may be provided to various users via the acquisition server or a separate distribution server.

BRIEF DESCRIPTION OF THE DRAWINGS

For the present disclosure to be easily understood and readily practiced, the present disclosure will now be described, in conjunction with preferred embodiments thereof, for purposes of illustration and not limitation, in connection with the following figures wherein:

FIG. 2A is a timeline of file/slide transitions of a Power Point presentation;

FIG. 2B is a timeline associated with an uncompressed video stream;

FIG. 2C is a timeline associated with a compressed video stream;

FIG. 2D is a timeline associated with an audio histogram;

FIG. 2E is a time line associated with a capture device interaction;

FIG. 2F is a timeline associated with a first user's notes;

FIG. 2G is a timeline associated with a second user's notes;

FIG. 2H is a single composite shared time line;

FIG. 2I is an augmented composite shared timeline.

DESCRIPTION

Figure 1:
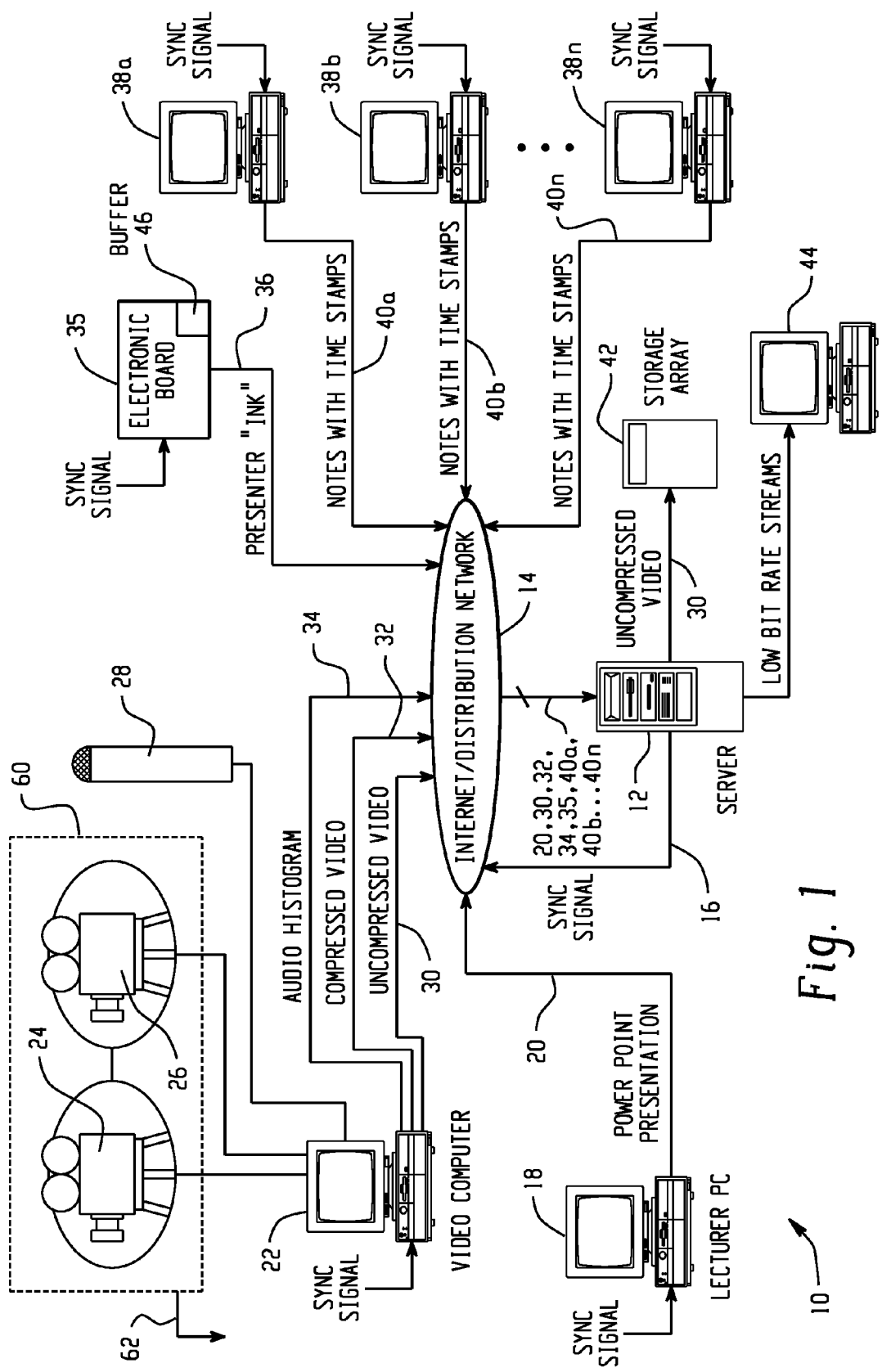
FIG. 1 is a block diagram of a system configuration which may be used to implement a session acquisition mode according to various embodiments of the invention disclosed herein.

FIG. 1 is a block diagram of a system 10 which may be used to implement various embodiments of the present invention. The system 10 is exemplary. The direction of information flow as illustrated by the arrows in FIG. 1 illustrates the system's operation during a session acquisition mode.

The system 10 may be comprised of a server 12, which provides a focal point for the reception of various acquisition streams (discussed below) through, for example, the Internet or other type of distribution/communication network 14. The server 12 is capable of providing a synchronization (sync) signal 16 to various capture devices (discussed below) through the network 14.

In FIG. 1, a first type of capture device is a lecturer's personal or desktop computer (PC) 18 which carries a Power Point presentation. The PC 18 may receive the sync signal 16. The PC 18 produces an acquisition stream 20 which in this case is a set of Power Point files along with time stamps associated with file/slide transitions (see FIG. 2A). If the PC 18 received the sync signal 16, then the time stamps will be in sync with a global time line (see FIG. 2H); if the PC did not receive the sync signal 16 (e.g. the network connection was terminated), then the acquisition stream 20 will have local time stamps relative to the start which will have to be aligned (as discussed below) with the global time line.

A video computer 22 operating in conjunction with a first camera 24 forms a second type of capture device. The camera 24 may be operated by a videographer and may be used to follow the lecturer although in other embodiments, discussed below, a real time videographer is not needed. The video computer 22 operating in conjunction with a second camera 26 forms another example of the second type of capture device. In the case of camera 26, that camera may be fixed on a chalk board (not shown) or other type of display that may vary slowly over time. The video computer 22 operating in conjunction with a microphone 28 forms a third type of video capture device. The video computer 22 produces three acquisition streams, an uncompressed video stream 30 (used to produce a distribution session as discussed below) having timestamps shown in FIG. 2B, a compressed video stream 32 (used for editing as discussed below) having timestamps shown in FIG. 2C, and an audio histogram 32 (from which the audio portion of the presentation can be reproduced as is known in the art) having timestamps shown in FIG. 2D. If the computer 22 received the sync signal 16, then each of the acquisition streams 30, 32, 34 will have timestamps that will be in sync with the global time line; if the computer 22 did not receive the sync signal 16, then the acquisition streams 30, 32, 34 will have local time stamps which will have to be aligned (as discussed below) with the global time line.

Another type of capture device is an electronic board or tablet PC 35 of the type that can sense what has been written on the board or PC and output the sensed material as a "presenter's ink" acquisition stream 36. If the electronic board/PC 35 received the sync signal 16, then the acquisition stream 36 will have timestamps (see FIG. 2E) that are in sync with the global time line; if the electronic board/PC 35 did not receive the sync signal 16, then the acquisition stream 36 will have local timestamps which will have to be aligned with the global time line.

Figure 2:
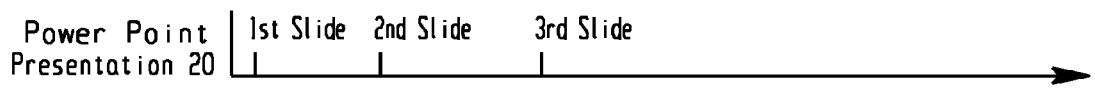
FIG. 2 illustrates how a wide diversity of heterogeneous acquisition streams which may be generated by separate (or the same) computer(s), or other capture devices, which may or may not be connected to a network, are integrated into a global timeline which defines a single session stream.

Personal computers 38a, 38b . . . 38n represent yet another type of capture device. The personal computers 38a, 38b . . . 38n may be used by students or others listening to the presentation. Each of the computers 38a, 38b . . . 38n may produce an acquisition stream 40a, 40b . . . 40n, respectively, that is comprised of notes (annotations) and timestamps shown in FIGS. 2F, 2G and 2I, respectively. The acquisition streams 40a, 40b . . . 40n (or any of the other acquisition streams) may be marked "public" or "private" to control access to the content in that acquisition stream. If the personal computers 38a, 38b . . . 38n received the sync signal 16, the timestamps will be in sync with the global time line; if the computers 38a, 38b . . . 38n did not receive the sync signal, then the timestamps will be local and will have to be aligned with the global time line. It is anticipated, as with the other capture devices, that certain of the computers 38a, 38b . . . 38n may be in sync with the global time line and on during the entire presentation (FIG. 2F), certain of the computers 38a, 38b . . . 38n may be in sync with the global time line but may on for less than the entire presentation (including multiple on and off times)(FIG. 2G), while certain of the computers 38a, 38b . . . 38n may be offline and thus not in sync with the global timeline (FIG. 2I). This type of capture (e.g. student notes) may also be performed after the video capture is complete, for example, while a person is viewing a stored version of the presentation.

Completing the description of FIG. 1, the various acquisition streams 20, 30, 32, 34, 36, 40a, 40b . . . 40n are delivered via the network 14 to the server 12. The uncompressed video acquisition stream 30 is input to a storage device 42. If the storage device 42 is separately addressable via the network 14, the uncompressed video acquisition steam 30 could be delivered directly to the storage device 42. Finally, an editing server is provided by, for example, a computer 44. The editing server 44 receives a low bit rate copy of the various acquisition streams 20, 30, 32, 34, 36, 40a, 40b . . . 40n. In another embodiment, the function of the editing server is performed by the server 12 and the computer 44 is used to access the editing function.

The acquisition process results in a single composite shared timeline seen in FIG. 2H. The acquisition can be synchronous, where all acquisition is occurring simultaneously (FIGS. 2A-2G), or asynchronous, where some acquisition streams are integrated into the global timeline after the original activity is completed (FIG. 2I).

Not all (or any) of the capture devices need necessarily be on the network 14 (i.e. online or in sync with the global timeline) during the acquisition mode. Indeed, data can be transferred from any capture device via the network 14 synchronously during the activity, over the network after-the-fact (for example, when the particular capture device is offline (i.e. not on the network)), or physically from a capture device to the server 12.

As discussed above, multiple-stream content acquisition is enable by using multiple capture devices, each one capturing one or more types of content. Examples of content streams include but are not limited to, high-motion video, low-motion/high-resolution video, screen capture, slide-show viewer (e.g. PowerPoint or PDF) slide changes, and audio. The content acquisition mode has two modes of operation: network-connected (online) and network-independent (offline). The final product is identical for each mode of operation, but the method of synchronizing the various acquisition streams differs between the two modes.

In the "online" mode, the capture devices begin individually capturing content in response to either an operator-generated "begin acquisition" command or the system generated sync signal 16. The server 12 logs the beginning and end of each acquisition interval, as well as any time-stamped events generated during the capture interval, against the global timeline (FIG. 2H) maintained by the server 12. Once all the capture devices inform the server 12 that each has finished acquiring its particular content stream, the acquisition session is complete. Capture devices may upload synchronously as data is acquired or asynchronously, by buffering data on the capture device prior to sending the data to the server 12.

In the "offline" mode, the capture devices begin individually capturing content in response to the user-generated "begin acquisition" command. This case differs from the "online" mode primarily in that none of the capture devices can be assumed to be able to interact with the server 12, and that any content acquired by such capture devices is done on a local timeline which must be aligned with the global timeline through an external process. An example of this process might be human manipulation of a particular acquisition stream's start time relative to the global timeline, thus synchronizing that stream with the other streams sharing the global timeline. Whether that manipulation is considered part of the acquisition process or part of the editing process is not of significance. The outcome of this process should be an interval of multi-stream content in which the same event (for example, a lecturer changing the current slide) happens simultaneously in all the acquisition streams.

In both modes, a low-fidelity, low-bit-rate mirror copy of each acquisition stream is conveyed to and stored on the editing server 44. In the online mode, that happens at acquisition time. In the offline mode, that happens when a network connection is made available to the capture device storing a previously acquired content stream, and the low-fidelity mirror copy of that content stream is transferred to the editing server 44.

As discussed above with FIG. 1, certain of the capture devices may be PCs. These PCs can be ordinary commodity laptop or desktop computers. The clocks on the computers do not necessarily need to be synchronized.

When one (or more) of the capture devices is attached to a network, content is captured and may be stored locally on the capture device and sent to the server 12, possibly asynchronously (as noted above). In particular, should the network connection be broken due to a network failure, server failure, or localized failure on the capture device, no content data is lost because the content data is also buffered on the capture device (see for example, buffer 46 on the electronic board/PC 35) and can be uploaded (as noted above) after the fact.

At some time following the multi-stream acquisition session, the original, archival-quality versions of each stream are transferred to the editing server 44 and stored there.

The acquisition streams encompassed by this disclosure include both media streams and event streams. A given set of streams can include zero or more representatives of each kind of stream. For example, an acquisition session could include two video media streams and two PowerPoint event streams.

Media streams include, but are not limited to the following:

Video at any resolution (including low-resolution such as 320×240 and high resolution such as 1920×1080 HDTV) and at any frame rate (such as high-speed 60 Hz, slow speed, and time-lapse). Video can be captured either in archival digital video (DV) form or in a streaming format.

Audio, either as an integral part of a video source stream or as a separate stream.

Screen capture on a presenter computer, possibly represented as a video stream.

Event streams include, but are not limited to the following:

Microsoft PowerPoint presentations, represented as a pair of a set of PowerPoint files and a sequence of timestamps for transition points in the presentation (builds or slide changes). A PowerPoint presentation stream can include multiple PowerPoint files and navigation among the slides in them, including switching from one file to another;

screen capture on a presenter's computer, possibly represented as a set of pairs of images and timestamps;

ink event streams from a tablet computer or other source. This could include, for example, ink from one or more presenters or from other sources, such as viewer annotations or from a software application that generates ink;

other slide presentations, such as sequences of Adobe PDF images, Apple Keynote presentations, etc. These are managed in a manner analogous to PowerPoint as described above;

text, either as rich text or as plain text. Text can be captured in relatively small segments each of which receives a timestamp when it is captured. The representation is thus a set of pairs of text segments and timestamps. Text segments may also include formatting information such as outline indentation, type faces, fonts, highlighting, and so on. One way to capture text is from a text-capture client, which presents a human user experience similar to an instant messaging client. Text may also be captured using conventional text editing tools such as Microsoft Word that are instrumented to acquire timestamp information or by software development tools ("IDEs") such as Eclipse that are instrumented to identify visible lines of software code;

tag events, which associate a particular meaning with a timestamp in the capture session. For example, a presenter could create a tag event (e.g., by pushing a special button on a lectern console or a function key on a computer) to identify for later use (say, in editing) a time position in the overall capture session. This could signal a change of topic, or the start of a break, or some other information that can assist a person editing the streams at a later time. It could also itself be incorporated automatically by the rendering tool in a rendering as a switch, for example, from one stream to another in a presentation tool.

Figure 3:
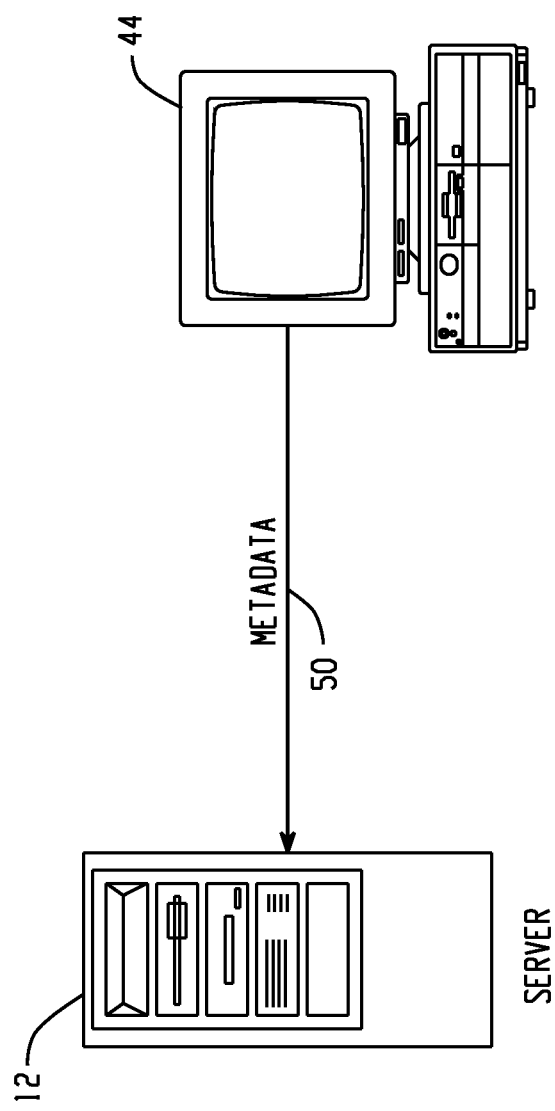
FIG. 3 is a block diagram of a system configuration which may be used to implement an edit mode according to various embodiments of the invention disclosed herein.

Turning now to FIG. 3, FIG. 3 illustrations a portion of the network shown in FIG. 1 which may be used to implement an edit mode or perform an editing process on the acquired content. The arrow in FIG. 3 shows the flow of metadata 50 from the computer 44 having the editor to the server 12. It is assumed that all of the acquisition streams are aligned with the global timeline and that the low resolution versions of all of the acquisition streams have already been stored in computer 44.

The goal of the editing process is to produce modifications of the absolute timeline, which are stored by the server 12 as meta-data 50, for use in asynchronously generating a representation of, or derivative of, the acquired multi-stream content for delivery to end users. The editor can simultaneously edit the multiple streams to generate the metadata 50 that describes a resulting distribution stream that can include shifts of focus from one data stream to another, realignment of segments of the original timeline, etc.

Figure 4:
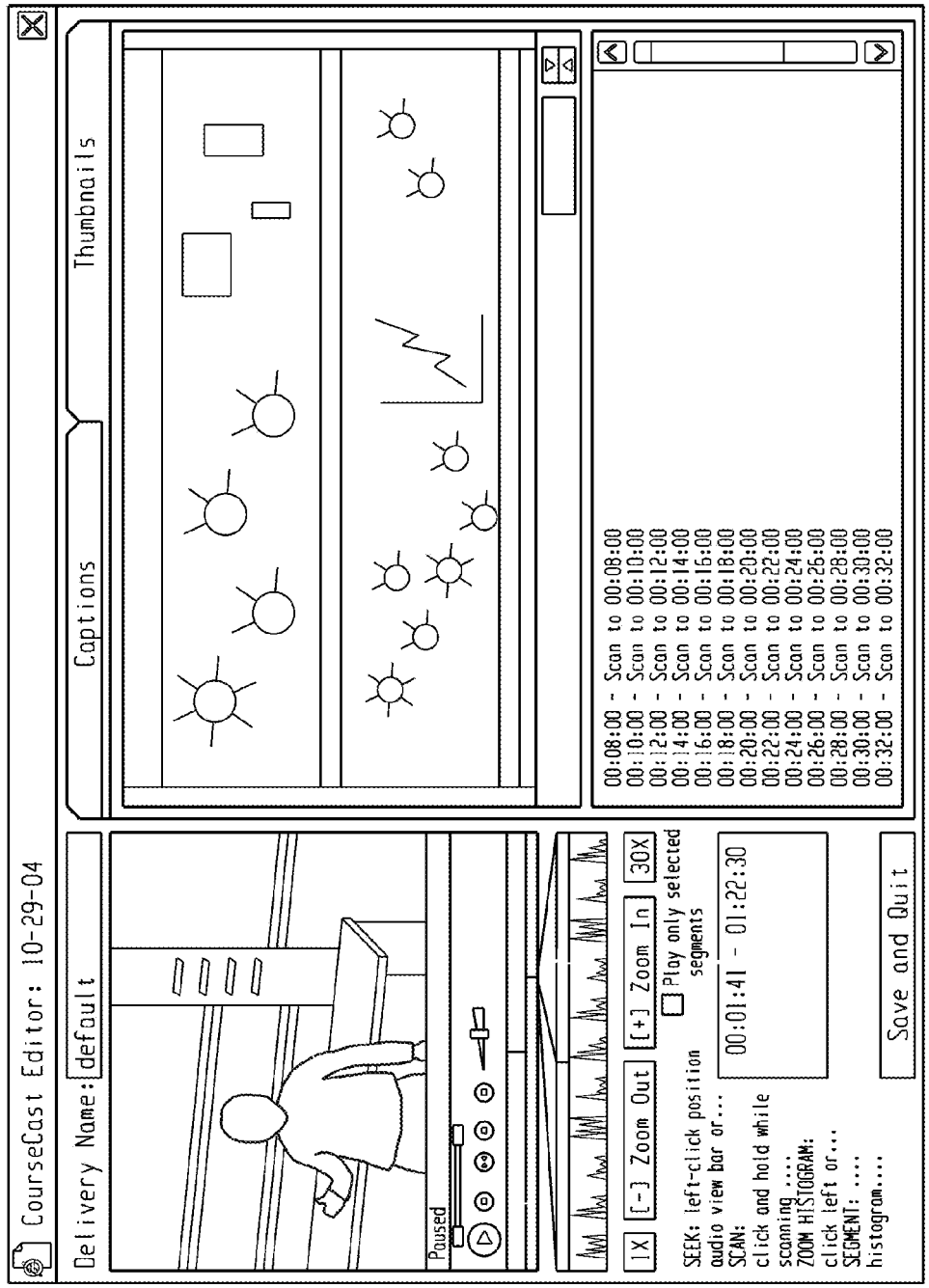
FIGS. 4 and 5 are screenshots illustrating operation of an editor disclosed herein.
Figure 5:
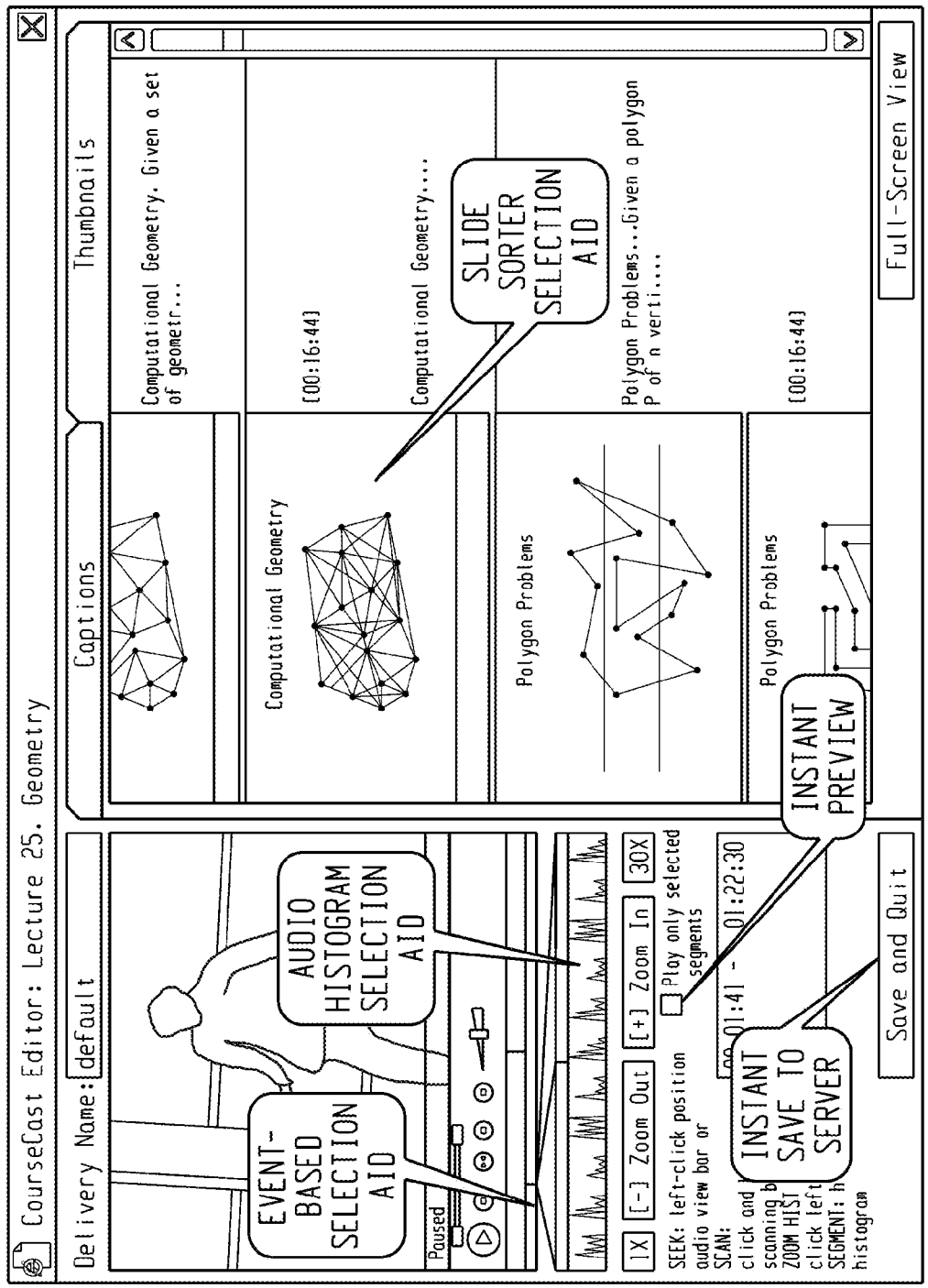

During the editing process, the user interacts with an editing client application, running on, for example, computer 44. If the editor resides on server 12, then the computer 44 would need a moderate-bandwidth network so as to access the low bit-rate copies stored on server 12. Visualization windows, examples of which are seen in FIGS. 4 and 5, are shown within the editor of the low bit-rate mirror copies of each acquired stream in a given multi-stream acquisition session. The user can play, pause, seek, or scan all streams simultaneously by interacting, via the client application/editor, with the absolute timeline for the acquisition session. In doing so, the user may choose to do several of the following operations (not a comprehensive list): eliminate portions of the absolute timeline altogether; alter the order of segments of the absolute timeline; merge and alter the timelines of two or more multi-stream acquisition sessions; and determine which subset of the multiple acquired streams will be visible to the end user in the end product (distribution stream).

The editor is designed to be used by videographers as well as presenters. The editor is fast. There is no waiting during editing, no waiting for a review, and no waiting for a save. Segmentation is done with precise cuts. Slide boundaries and identified events can be quickly selected. Fine tuning is done very rapidly. The "seek time" is effectively zero. The audio histogram can be used to define cuts on sentence boundaries.

Typical use cases for the editor are as follows. The videographer will want to eliminate start-up and tear-down. That means the videographer can turn on the camera whenever they want and edit out the set-up and tear-down later. The instructor/presenter may want to break long lectures into shorter topic-focused segments. The instructor/presenter may want to edit out segments such as bad jokes, breaks, or off-topic digressions. The instructor/presenter may want to edit out short clips for frequently asked questions on homework assignments or other topics. The edited out clips could be posted separately. Multiple edit results (deliveries) may be created from the same global timeline.

Figure 6:
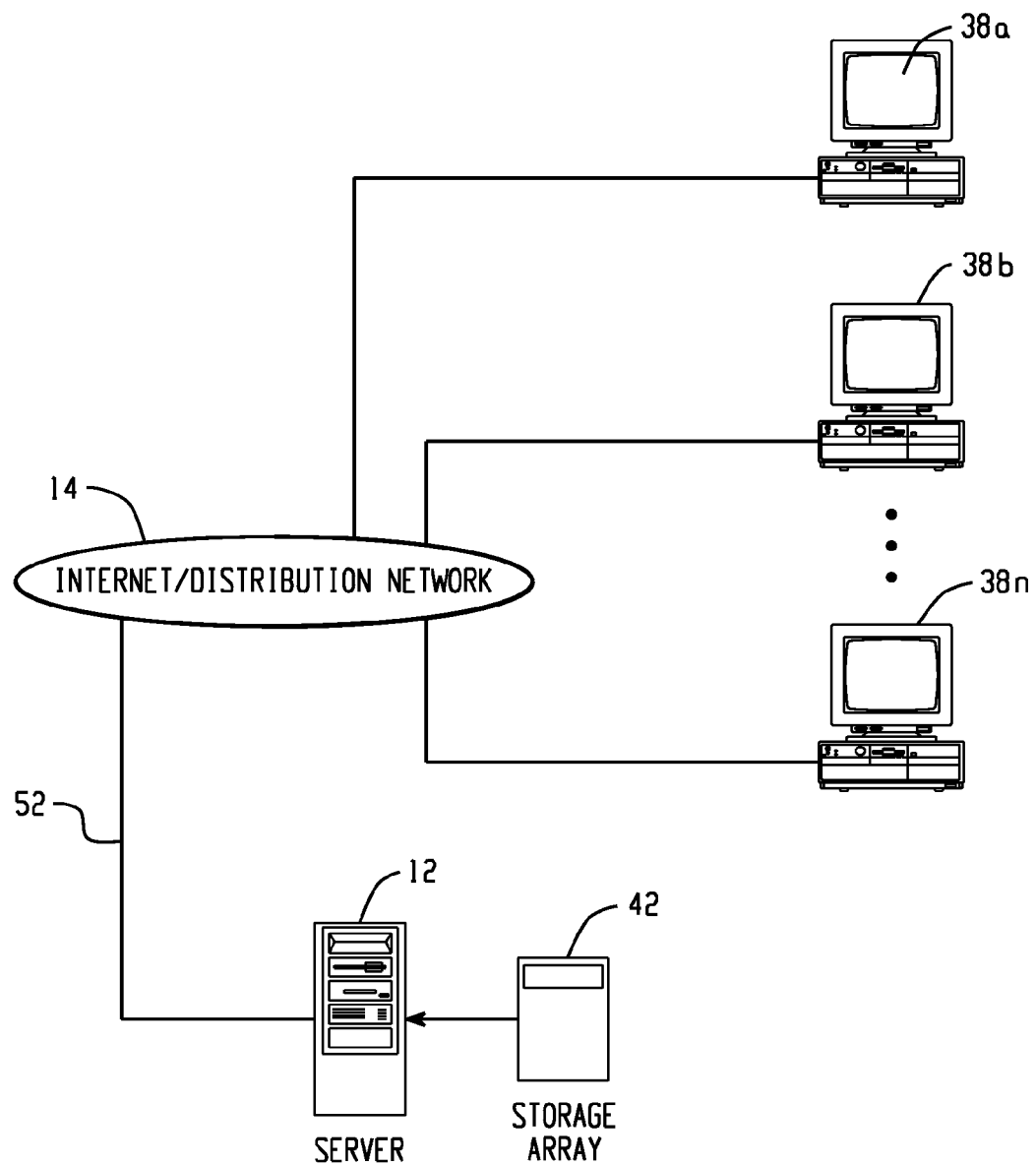
FIG. 6 is a block diagram of a system configuration which may be used to implement a playback or distribution mode according to various embodiments of the invention disclosed herein.

Once the metadata 50 is used to edit the global timeline to produce an edited global timeline, it is possible to render the sections of the acquisition streams according to the edited global timeline in a playback or distribution mode. The portion of the system 10 of FIG. 1 used in the playback or distribution mode is illustrated in FIG. 6. In FIG. 6, the server 12 acts as both the acquisition and the distribution server, although a separate server (not shown) could be used as the distribution server. The playback or distribution mode is the overall activity of taking the captured acquisition streams and presenting them in accordance with the edited global timeline. More specifically, the distribution process takes as input one or more source media streams (the stream input process) from storage device 42, and the edited global timeline (the edit input process), and produces as an output one or more distribution streams 52 aligned according to the edited global timeline. The rendered session is a self-contained object encapsulating binary data for each distribution stream that (ideally but not exclusively) contains only the segments (for example, video frames) of the source streams specified in the edited global timeline. In the preferred embodiment, it is anticipated that new distribution streams will be created.

In the case of video streams, a compressed video output stream might be created from the archival-quality source stream by compressing only the source video frames that fall within the segments specified in the edited timeline. That output stream may be redistributed along with other components of the rendered session, independently of the source video stream from which it is generated. In the case of all other media streams (audio, etc), only the stream data corresponding to the segments specified in the edited timeline would be present in the distribution stream.

In the case of event streams, which are composed of a series of discrete time-stamped events corresponding to units of data (for example, a PowerPoint slide or a single instant message), only events whose timestamps fall within the segments specified in the edited timeline would be present in the distribution stream.

The rendering or playback process always results in a timeline in which all streams are synchronized precisely as they were in the global timeline. By example, this means that a given PowerPoint slide event in all rendered sessions always occurs at exactly the same instant relative to a source video stream as it did in the global timeline. Adjustments to the timestamps are possible.

The distribution stream may be played back as a continuous unit of media in which one or more source streams are displayed. It may be seeked (i.e., random access to time points in the stream), paused, fast-forwarded, rewound, etc. and played for its duration with no apparent breaks or discontinuities.

The distribution stream 52 may be distributed via network 14 using network streaming, physical media, etc. Viewing a distribution stream does not require that the content consumer have access to the original source streams.

The distribution stream 52 is rendered to a viewer using a presentation tool. The presentation tool could be a commodity web browser with plug-ins to support media streams and other kinds of rendering particular to the kinds of source streams, edited forms of which are incorporated into the presentation. The presentation tool could also be a custom software application that runs on a standard desktop or laptop computer or on an appliance such as a television set. The exact layout, including dimensions, that is offered by the presentation tool to a person viewing the distribution stream is determined by a combination of the presentation tool design, the editor, and the configuration of the viewer.

Figure 7:
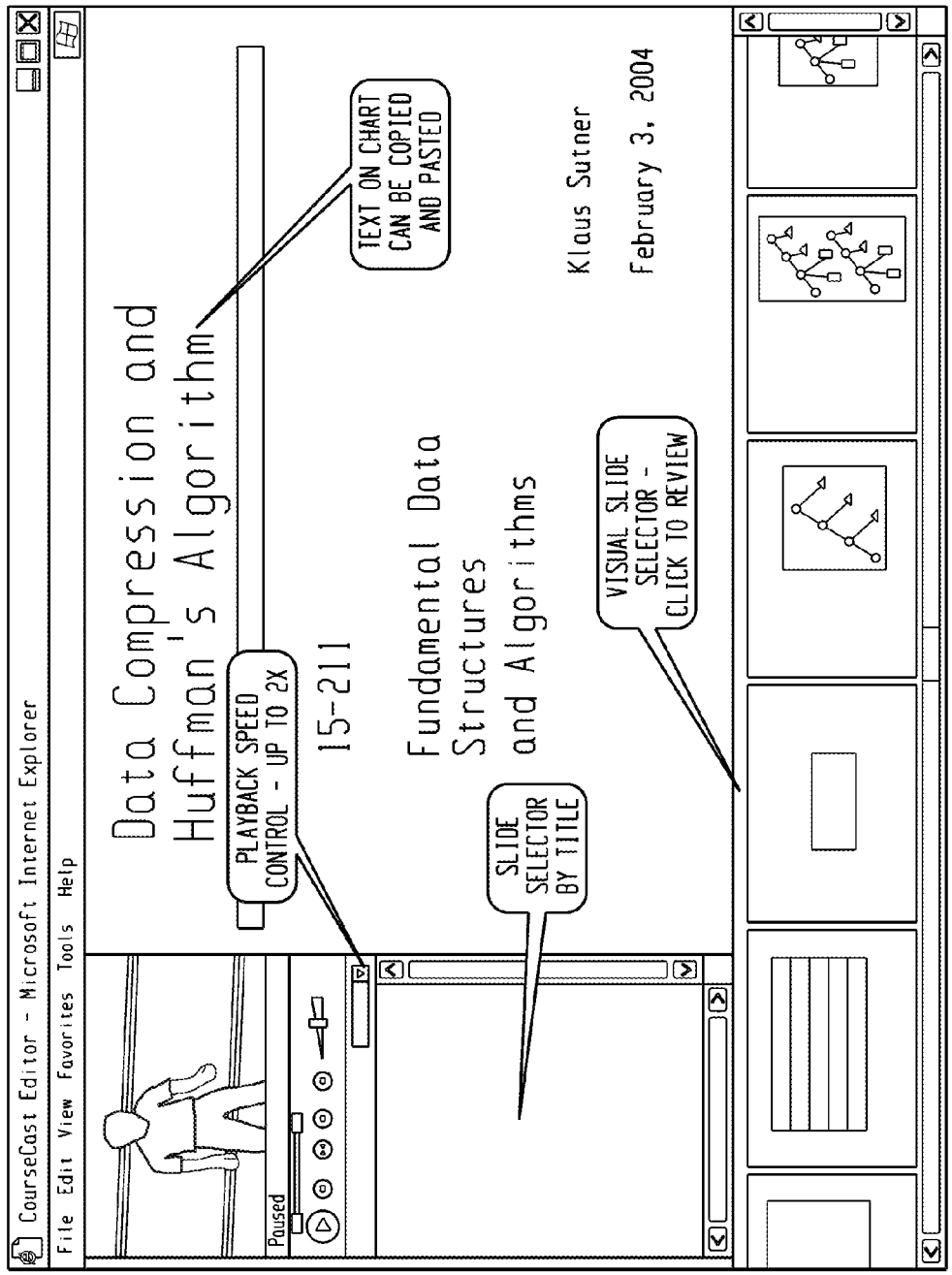
FIGS. 7-10 are screenshots illustrating a user's experience accessing a distribution stream during the playback or distribution mode.
Figure 8:
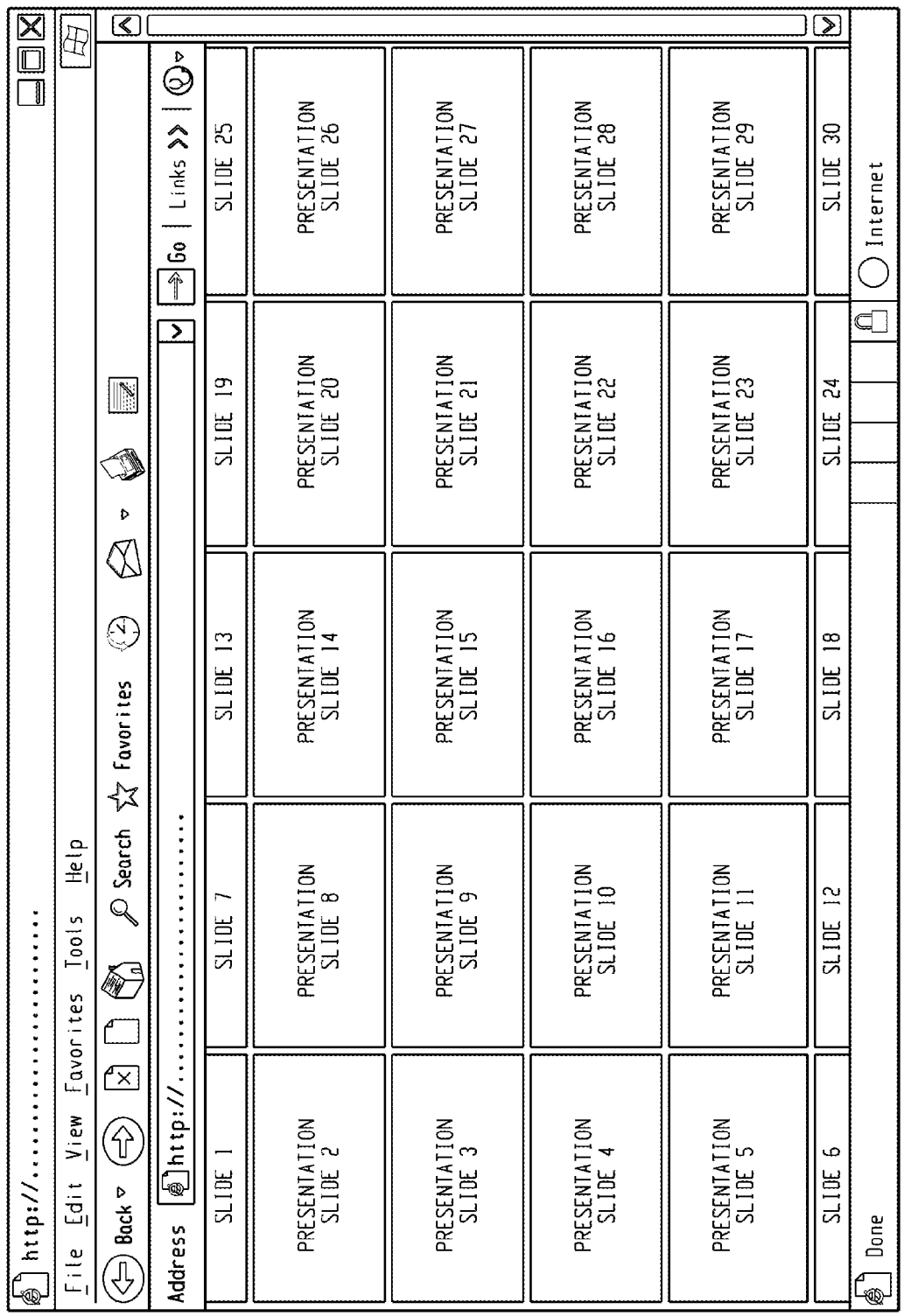
Figure 9:
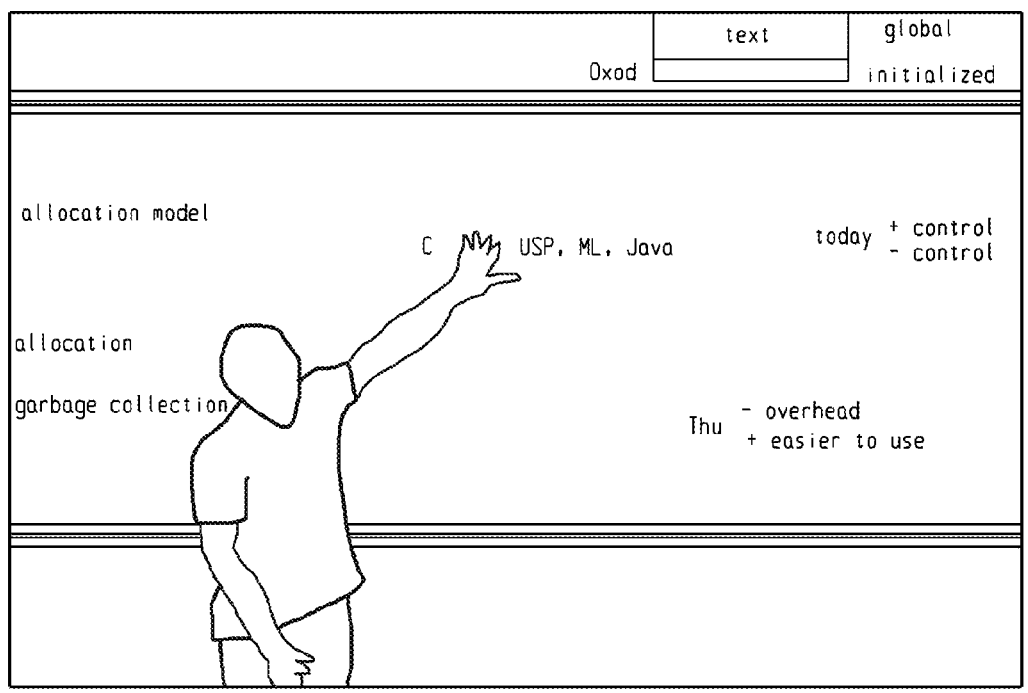
Figure 10:
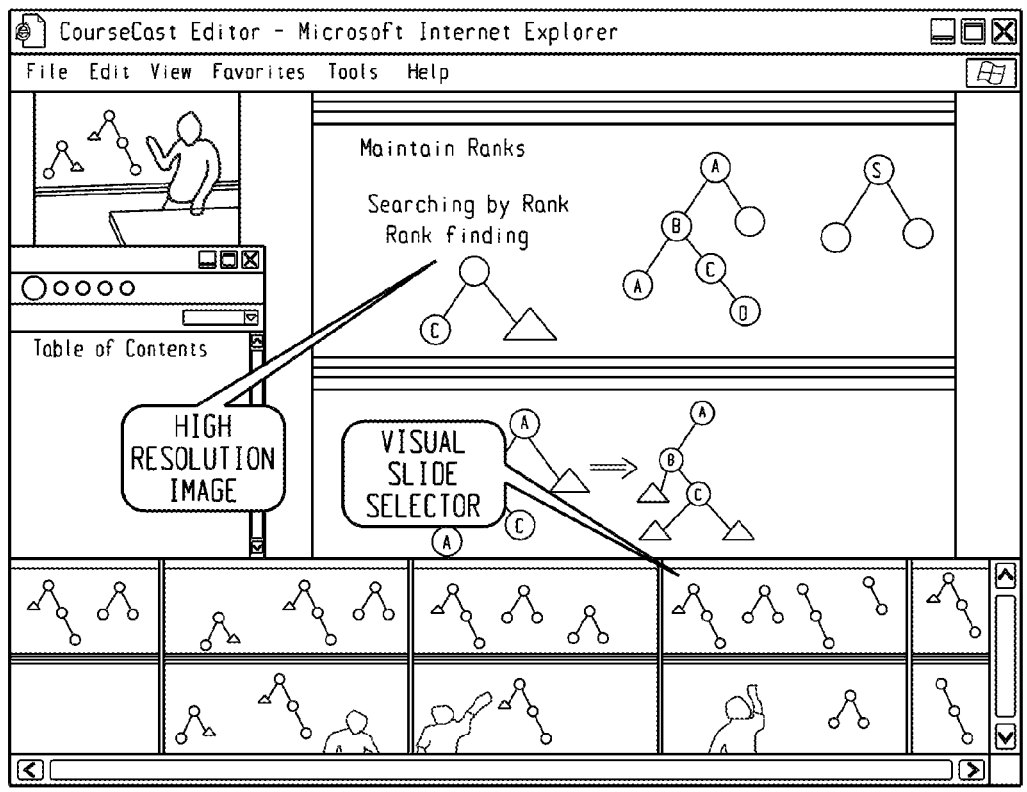
Figure 11:
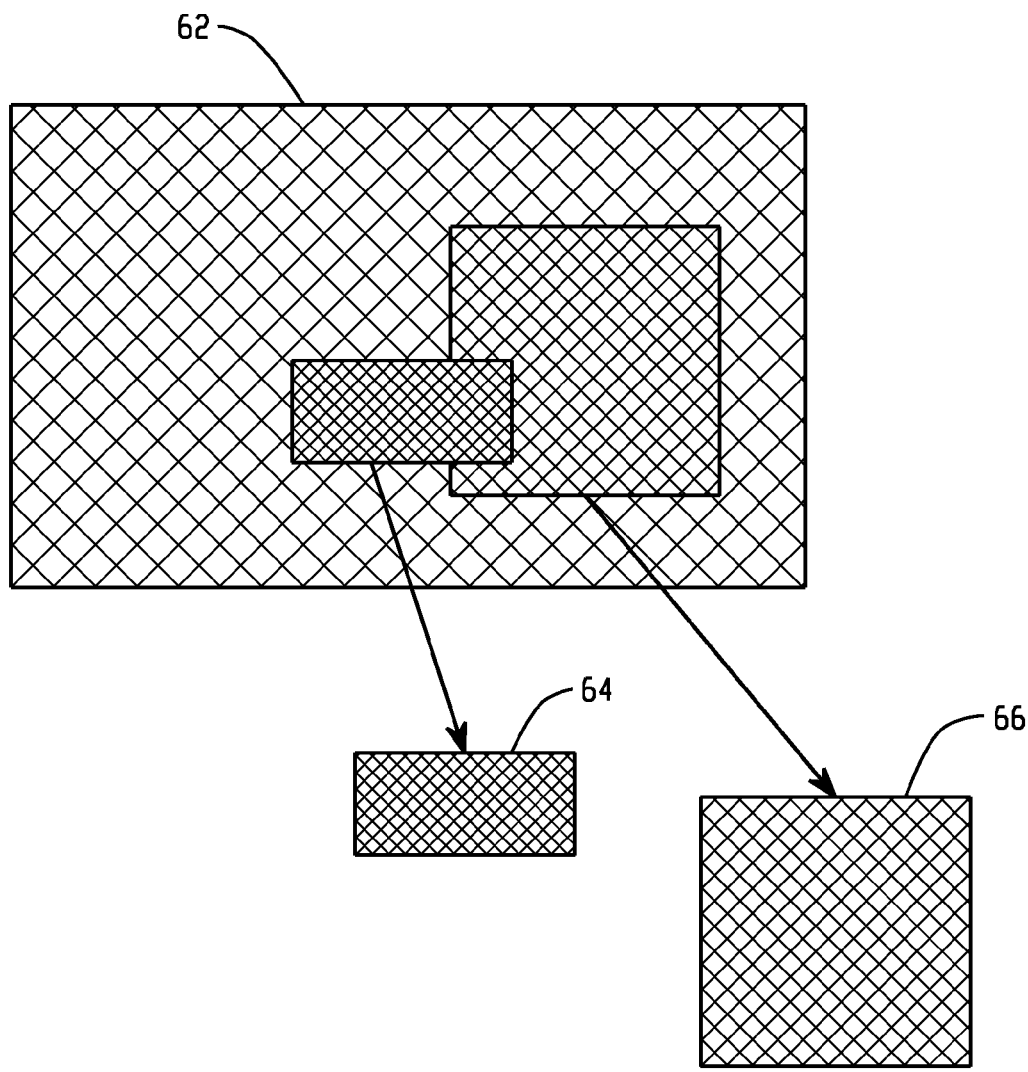
FIG. 11 illustrates a function of sub-rectangle selection which may be performed by the editor according to one embodiment of the present invention.

FIGS. 7-10 are screenshots illustrating a user's experience accessing a distribution stream during the playback or distribution mode. In FIG. 7, an overall view of what the user, in this case a student, would see is illustrated. The student has the ability to speed up or slow down the distribution stream. Index tools are available to allow access by slide (e.g., slide selector, slide sorter view), by bookmark (e.g., explicit bookmark in sequence, URL link), by time (e.g., time select in video stream), or by content (e.g., search Power Point slide text across one or more lectures). FIG. 8 illustrates the slide sorter view in detail. Selecting (clicking on) a slide immediately takes the user to that part of the presentation. FIG. 9 illustrates the ability to capture content on a chalkboard or other stationary live action with very high resolution and, in the case of a chalkboard or the like, possibly a slow framerate. FIG. 10 illustrates how users may index the images on the chalkboard which scroll across the bottom. Clicking on an image immediately takes the user to that part of the presentation.

Returning to FIG. 1, an alternative embodiment will now be described. Recall that in the original system 10, two cameras 24, 26, were used. One camera was used to track the presenter and the other was fixed on a chalkboard or the like. In this embodiment, the two cameras are replaced with a single, high definition camera represented by the dotted box 60. The camera 60 produces an acquisition stream 62, including timestamps, which is an image of the entire field of view of interest (e.g. the entire front of a classroom) in high definition (e.g. 4096×2560, 1920×1080, etc.)). Once the acquisition stream 62 has been captured, and the low bit-rate version stored by the editor, selection of one or more rectangles (portions of the entire field of view) can be easily accomplished in the editing mode.

For example, as shown in FIG. 10, it is possible to select one or more sub-rectangles (i.e. viewing windows) of arbitrary dimensions from the original video stream 62 and include only the contents of the selected sub-rectangles in a distribution stream. In our example case, the editing client user might choose to select a 320×240 pixel viewing window 64 of interest that is moved within the original video stream 62 to maintain focus on the head and torso of the human speaker as he walks around the "frame" of the original video stream 62. When the distribution stream is produced during the rendering phase, it will appear to contain (in videographic terms) a "tight shot" of the speaker's head and torso.

Continuing with the example shown in FIG. 10, the editing client user may select, for example, a 1024×1024 pixel viewing window 66 from the original video stream 62. Again, the distribution stream produced during the rendering phase will appear to contain a tight shot of the region of interest.

One example of a possible human interface device for selecting rectangles 64, 66 in real-time or in post production, e.g., faster than real-time, is a common console type of game controller. The game controller should have two analog thumb-sticks, where each analog thumb-stick corresponds to a rectangular region within the original video stream 62, and two analog triggers, one each for controlling the zoom for one of the rectangles. Superimposed on the display window of the original video stream 62 are the sub-rectangles whose dimensions are controlled by the analog triggers and whose positions are controlled by the analog thumb-sticks. In this manner, we can create two or more sub-selection, possibly overlapping rectangles in the distribution (output) stream, each with its own pixel dimensionality and frame rate. The resulting distribution video stream can have pixel dimensions different from one point in time to the next resulting in the appearance of zoom or widening. The selection/positioning/sizing of the sub-rectangles in the distribution stream yields a metadata stream like any of the other editing functions disclosed herein. The metadata stream instructs the server 14 to transform the original global timeline to produce an edited timeline from which the distribution stream is created. That type of editing function can be integrated into the editor or done separately.

The selection/positioning/sizing of any of the delivery streams can be later revised creating new metadata and thus additional distribution streams. Additional benefits include the elimination of gimbel mounts, zoom lenses, and the need for a videographer in the presentation room.

The system 10 disclosed herein has several advantages. For example, the computer on which the editor runs need not store copies of any of the multiple video streams in an acquisition session, nor does it need to have direct network access to the high bit-rate original copies. This is different from traditional client-side editing systems, in which local copies of the original high bit-rate files must be present on the computer running the editing software for any selection or manipulation operations to take place.

The editor can be run on multiple computers simultaneously, each one editing the original global timeline to produce a different result.

Because low-fidelity representations of the original streams are used for selection and manipulation of content, the network connection between the editing client computer and the editing server can be of far lower bandwidth than would be required if this operation were performed using the original high-fidelity video streams.

In the online acquisition case, the low-fidelity mirror streams and the audio histogram can be generated and transferred to the editing server in real-time. This allows an editing client user to begin an editing operation immediately after the multi-stream acquisition session terminates, and before the high-fidelity original streams have even been transferred from the acquisition systems to the editing server.

Edit inputs or selection guidance inputs are gathered for the rendering process at multiple times, including the time of capture and zero or more times after capture. All the inputs contribute to the edited timeline. Selection guidance can come from different kinds of sources, including: (1) use of the editing client application, (2) video selection human interface device used by videographer during the capture session, (3) video selection human interface device used after the capture session, and (4) automated video focus device such as a commercial presenter tracking device ("necklace"). Those kinds of editing functions can be integrated into the editor or done separately.

Selection guidance can be modified at any time prior to the rendering process. For example, if an automated video focus device gives erroneous tracking information, the selection rectangle it produces can later be adjusted using any of the means mentioned above. Selection guidance, whether automatically captured or manually recorded, can be used to create an edited timeline.

Metadata contained in the edited timeline can include rectangle selection within a given video stream, which may include (1) locating and sizing the rectangle, and (2) adjusting scale from source pixel dimensions (e.g., 640×480) to destination pixel dimensions (e.g., 320×240). Note: Where a selected rectangle is present, only the pixels specified by (1) the dimensions of the selected rectangle, and (2) its position within to the source video, are written to the image buffer to be compressed. Metadata contained in the edited timeline can also include timeline adjustments for an individual source stream, which may include (1) time shifting and (2) time expansion or contraction.

Figure 12:
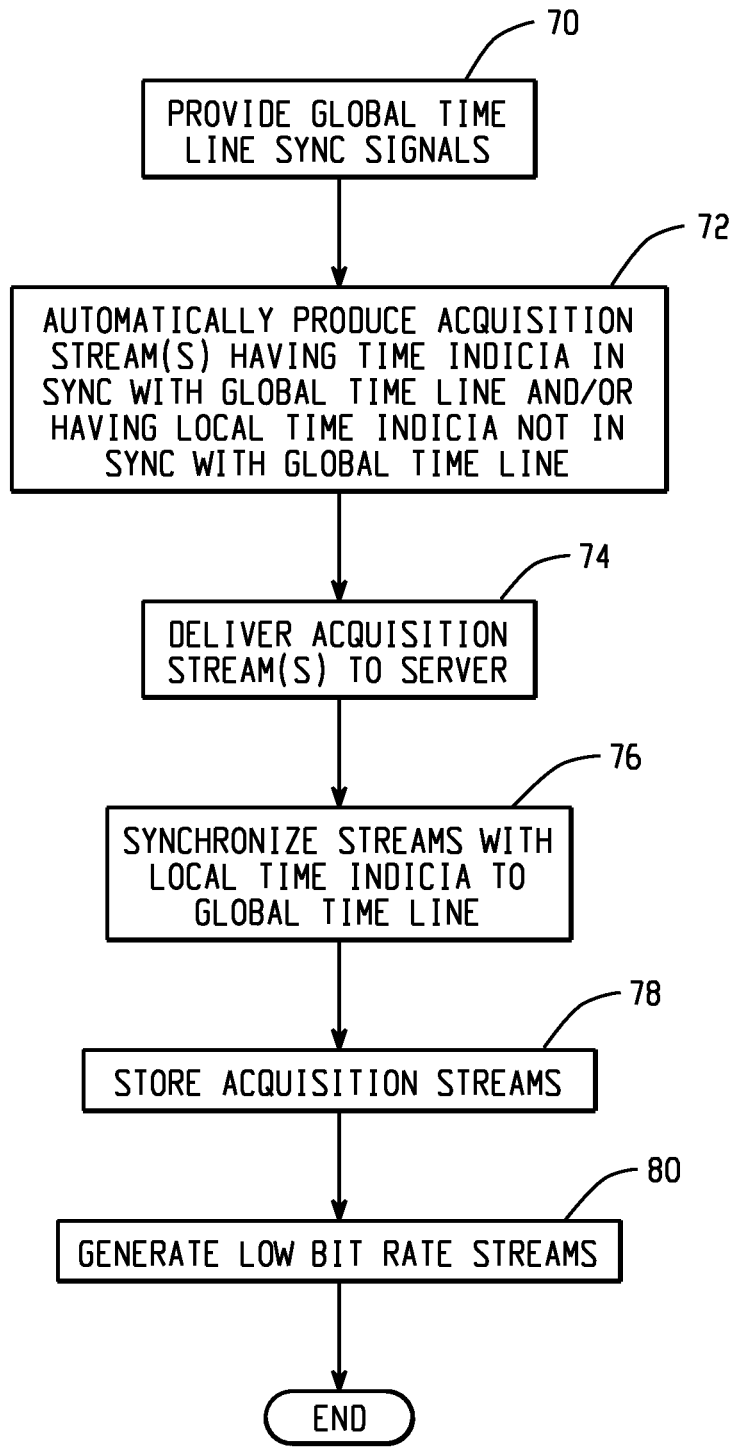
FIG. 12 illustrates one example of the steps in a session acquisition mode.
Figure 13:
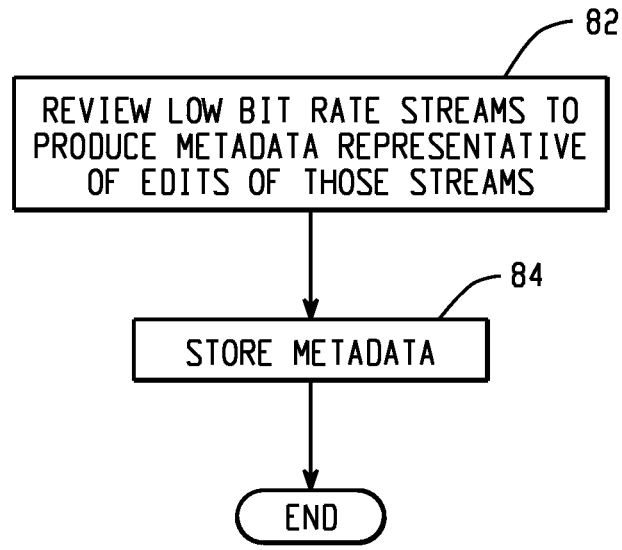
FIG. 13 illustrates one example of the steps in an edit mode.

Turning now to the remaining figures of the application, FIG. 12 illustrates one example of the steps in a session acquisition mode for the system illustrated in FIG. 1, FIG. 13 illustrates one example of the steps in an edit mode for the hardware of FIG. 3, and FIG. 4 illustrates one example of the steps in a playback or distribution mode for the hardware illustrated in FIG. 6. Turning first to FIG. 12, the first step 70 in the method is to provide the global timeline sync signal 16 to the various capture devices. In response to the global timeline sync signal 16, or a locally generated start signal, acquisition streams 20, 30, 32, 34, 36, 40*a*, 40*b*, ... 40*n*, 62 are automatically produced as shown by 72. Those acquisition streams produced by capture devices in sync with the global timeline will have time indicia in sync with the global timeline. Those capture devices which are not in sync with the global timeline will have local time indicia. The various acquisition streams are delivered to the server at 74. It should be noted that, as discussed above, the acquisition streams may be delivered at various times. Certain of the acquisition streams may be delivered synchronously, while other acquisition streams are delivered asynchronously. Additionally, certain acquisition streams may be produced at a much later point in time, such as when a user is viewing a distribution stream and creating notes based on viewing of the distribution stream. Under those circumstances, an acquisition stream is produced and delivered substantially later than the acquisition streams representing the initial presentation.

At 76, server 12 may synchronize those streams having local time indicia so that those acquisition streams will be in sync with the global timeline. The various acquisition streams are then stored at 78. Low bit rate streams corresponding to the stored acquisition streams are generated at 80 for use in subsequent editing of the acquisition streams.

The editing of the acquisition streams is illustrated in FIG. 13. Basically, the various acquisition streams may be reviewed and portions selected for replay as shown by 82. The portions selected for replay are identified through metadata which is then stored at 84.

Figure 14:
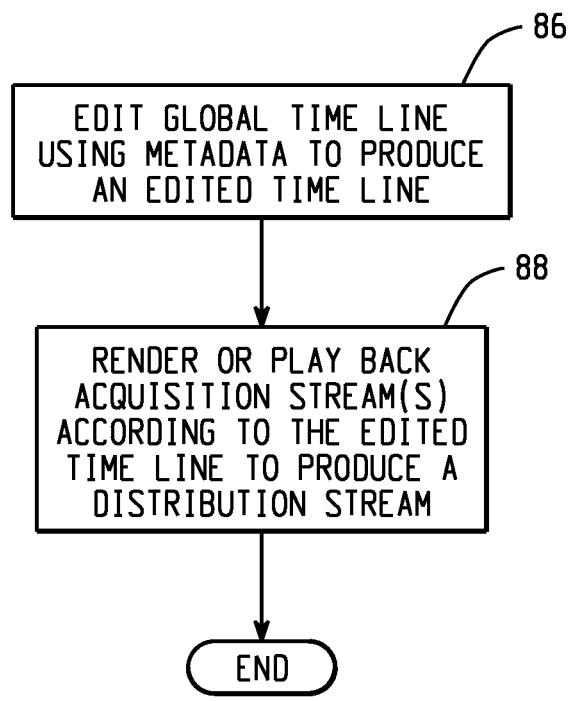
FIG. 14 illustrates one example of the steps in a playback or distribution mode.

Turning now to FIG. 14, the replay or distribution mode begins by editing the global timeline using the metadata generated in the editing mode so as to produce an edited timeline as shown by 86. The various acquisition streams are then rendered or played back according to the edited timeline to produce a distribution stream as shown by 88. The distribution stream may be provided to various users via the server 12, or a separate distribution server (not shown) may be used.

While the present disclosure has been described in connection with preferred embodiments thereof, those of ordinary skill in the art will recognize that many modifications and variations are possible. All such modifications and variations are intended to fall within the scope of the following claims.

What is claimed is:

1. A method for storing acquisition streams produced by a plurality of capture devices, comprising:
   receiving, at a server, a local acquisition stream from one of a plurality of capture devices, wherein the local acquisition stream received at the server includes local time indicia based on a local time including a local start time, wherein the local time differs from a global time;
   incorporating the local acquisition stream into a global timeline at the server based on said global time, wherein said incorporating includes:
      determining a difference between the local time and the global time;
      shifting the local start time relative to the global timeline based on the determined difference; and
      updating the global timeline to include data associated with the local acquisition stream based on the shifted local start time;
   incorporating a second acquisition stream into the global timeline; and
   storing the global timeline in a computer-readable memory.

2. The method of claim 1, further comprising:
   producing metadata representing a desired distribution stream;
   using said metadata to modify said global timeline to produce an edited timeline; and
   storing said edited timeline.

3. The method of claim 2, further comprising rendering a distribution stream from said edited timeline and said acquisition streams.

4. The method of claim 2, wherein said metadata identifies a size and location for two viewing windows from a video stream.

5. The method of claim 1, further comprising buffering at least one of said acquisition streams.

6. The method of claim 1, further comprising automatically producing an acquisition stream with a capture device operated in an offline mode with respect to said server, and
   synchronizing said acquisition stream with said global timeline.

7. The method of claim 1, wherein a sync signal associated with the global timeline is transmitted to one of the plurality of capture devices;
   wherein a synchronized acquisition stream is received from the capture device that receives the sync signal, wherein the synchronized acquisition stream has time indicia in sync with the global timeline based on the sync signal; and
   wherein the synchronized acquisition stream is aligned with the global timeline based on the synchronized acquisition stream being in sync with the global timeline.

8. The method of claim 1, further comprising generating a composite video based upon the global timeline.

9. The method of claim 8, wherein the plurality of acquisition streams capture a single presentation from multiple perspectives.

10. The method of claim 9, wherein the multiple perspectives include two or more of:
    a video recording from a first video recording device, a video recording from a second video recording device, an audio recording, screen captures from a presenter computer, a slide presentation, annotations made during the presentation, text annotations, and caption text.

11. The method of claim 9, wherein the composite video displays at least two of the multiple perspectives simultaneously.

12. The method of claim 11, wherein a first of the simultaneously displayed perspectives is associated with the local acquisition stream, wherein the first and a second of the simultaneously displayed perspectives capture an event of the presentation, and wherein said shifting of the local start time of the local acquisition stream results in the first and second simultaneously displayed perspectives showing the event in unison in the composite video.

13. A system for storing acquisition streams produced by a plurality of capture devices, comprising:
    one or more data processors;
    a non-transitory computer-readable medium encoded with instructions for commanding the one or more data processors to execute steps that include:
       receiving, at a server, a local acquisition stream from one of a plurality of capture devices, wherein the local acquisition stream received at the server includes local time indicia based on a local time including a local start time, wherein the local time differs from a global time;
       incorporating the local acquisition stream into a global timeline at the server based on said global time, wherein said incorporating includes:
          determining a difference between the local time and the global time;
          shifting the local start time relative to the global timeline based on the determined difference; and
          updating the global timeline to include data associated with the local acquisition stream based on the shifted local start time;
       incorporating a second acquisition stream into the global timeline; and
       storing the global timeline in a computer-readable memory.

14. The system of claim 13, further comprising:
    producing metadata representing a desired distribution stream;
    using said metadata to modify said global timeline to produce an edited timeline; and
    storing said edited timeline.

15. The system of claim 14, further comprising rendering a distribution stream from said edited timeline and said acquisition streams.

16. The system of claim 14, wherein said metadata identifies a size and location for two viewing windows from a video stream.

17. The system of claim 14, wherein a sync signal associated with the global timeline is transmitted to one of the plurality of capture devices;
    wherein a synchronized acquisition stream is received from the capture device that receives the sync signal, wherein the synchronized acquisition stream has time indicia in sync with the global timeline based on the sync signal; and
    wherein the synchronized acquisition stream is aligned with the global timeline based on the synchronized acquisition stream being in sync with the global timeline.

18. The system of claim 14, further comprising generating a composite video based upon the global timeline.

19. The system of claim 18, wherein the plurality of acquisition streams capture a single presentation from multiple perspectives.

20. The system of claim 19, wherein the multiple perspectives include two or more of:
    a video recording from a first video recording device, a video recording from a second video recording device, an audio recording, screen captures from a presenter computer, a slide presentation, annotations made during the presentation, text annotations, and caption text.

21. The system of claim 19, wherein the composite video displays at least two of the multiple perspectives simultaneously.

22. The system of claim 21, wherein a first of the simultaneously displayed perspectives is associated with the local acquisition stream, wherein the first and a second of the simultaneously displayed perspectives capture an event of the presentation, and wherein said shifting of the local start time of the local acquisition stream results in the first and second simultaneously displayed perspectives showing the event in unison in the composite video.

23. The system of claim 13, further comprising buffering at least one of said acquisition streams.

24. The system of claim 13, further comprising automatically producing an acquisition stream with a capture device operated in an offline mode with respect to said server, and
    synchronizing said acquisition stream with said global timeline.

25. One or more non-transitory computer-readable mediums encoded with instructions for commanding one or more data processors to execute steps including:
    receiving, at a server, a local acquisition stream from one of a plurality of capture devices, wherein the local acquisition stream received at the server includes local time indicia based on a local time including a local start time, wherein the local time differs from a global time;
    incorporating the local acquisition stream into a global timeline at the server based on said global time, wherein said incorporating includes:
    determining a difference between the local time and the global time;
    shifting the local start time relative to the global timeline based on the determined difference; and
    updating the global timeline to include data associated with the local acquisition stream based on the shifted local start time;
    incorporating a second acquisition stream into the global timeline; and
    storing the global timeline in a computer-readable memory.

* * * * *